(12) United States Patent
Kim et al.

(10) Patent No.: US 6,477,274 B1
(45) Date of Patent: Nov. 5, 2002

(54) HANDWRITTEN CHARACTER RECOGNITION DEVICES AND ELECTRONIC DEVICES INCORPORATING SAME

(75) Inventors: Seung Kil Kim, Chapel Hill, NC (US); Michael D. Doub, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/425,637

(22) Filed: Oct. 22, 1999

(51) Int. Cl.[7] .................................................. G06K 9/28
(52) U.S. Cl. ..................... 382/187; 328/315; 178/18.03; 455/575
(58) Field of Search ................................. 382/315, 187, 382/189, 182; 345/173; 178/18.05, 18.03; 200/512, 514; 455/575, 466

(56) References Cited

U.S. PATENT DOCUMENTS

| | | | |
|---|---|---|---|
| 3,108,254 A | * 10/1963 | Dimond ....................... | 382/187 |
| 3,668,337 A | * 6/1972 | Sinclair ....................... | 200/5 A |
| 3,757,322 A | * 9/1973 | Barkan et al. ............ | 178/18.01 |
| 3,911,215 A | * 10/1975 | Hurst et al. ............... | 178/18.05 |
| 4,005,400 A | * 1/1977 | Engdahl .................... | 178/18.01 |
| 4,047,010 A | * 9/1977 | Perotto et al. ............. | 361/280 |
| 4,139,837 A | * 2/1979 | Liljenwall et al. ............ | 368/10 |
| 4,467,151 A | * 8/1984 | Johnson et al. ............. | 200/5 A |
| 4,484,026 A | * 11/1984 | Thornburg ............... | 178/18.05 |
| 5,283,558 A | * 2/1994 | Chan ....................... | 178/18.05 |
| 5,526,411 A | * 6/1996 | Krieter .................. | 379/110.01 |
| 5,818,430 A | * 10/1998 | Heiser ...................... | 178/18.05 |
| 5,959,260 A | 9/1999 | Hoghooghi et al. | |
| 6,269,260 B1 | * 7/2001 | Shin et al. ..................... | 341/22 |
| 6,408,188 B1 | * 6/2002 | Park ........................... | 340/7.21 |

FOREIGN PATENT DOCUMENTS

| | | | |
|---|---|---|---|
| EP | 0 779 715 A2 | 6/1997 | |
| FR | 2 648 255 | 6/1989 | |
| JP | 10164205 A | * 6/1998 | .......... H04M/01/21 |

OTHER PUBLICATIONS

International Search Report, International Application No. PCT/US00/40766, dated Feb. 1, 2001.

* cited by examiner

*Primary Examiner*—Jon Chang
(74) *Attorney, Agent, or Firm*—Myers Bigel Sibley & Sajovec

(57) ABSTRACT

Input devices for use with radiotelephones, and other electronic devices, recognize and display handwritten alphanumeric characters on a display. A plurality of adjacent touch switches are arranged in an array beneath an exposed touch pad. Each touch switch in the array produces, in response to user activation of an area of the touch pad during a handwriting stroke, a respective analog voltage signal. An analog/digital converter receives and converts a sequence of analog voltage signals produced by a user activating one or more of the touch switches during a handwriting stroke into a sequence of digital values. A processor, working in conjunction with a handwriting recognition algorithm, processes the sequence of digital values, recognizes the alphanumeric characters that corresponds to the handwriting strokes of the user, and then displays the recognized alphanumeric characters within the display.

37 Claims, 3 Drawing Sheets

HANDWRITTEN CHARACTER RECOGNITION DEVICES AND ELECTRONIC DEVICES INCORPORATING SAME

FIELD OF THE INVENTION

The present invention relates generally to telecommunications devices and, more particularly, to devices for composing messages to be transmitted by telecommunications devices.

BACKGROUND OF THE INVENTION

Telecommunications devices, such as radiotelephones, have become increasingly popular for both personal and commercial use. Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems. With their increase in popularity, radiotelephones have been undergoing miniaturization to facilitate storage and portability. Indeed, some contemporary radiotelephone models are only 9–12 centimeters in length.

SMS (Short Message Service) is a service for sending messages to and between telecommunications devices, such as radiotelephones, that use Global System for Mobile (GSM) communication. SMS messages are typically transmitted to a telecommunications device within the same cell or to a telecommunications device with roaming capability. However, SMS messages may not require a mobile telecommunications device to be active and within range. Furthermore, SMS messages may be held for a length of time until a mobile telecommunications device is active and within range.

SMS messages are conventionally composed using the keypad of a telecommunications device, such as a radiotelephone. Unfortunately, composing SMS messages with conventional keypads of radiotelephones may be difficult because of the limited number of keys (typically 18–20). Because of the limited number of keys, each key of a radiotelephone keypad typically performs multiple functions. For example, numeric key "2" may also represent the characters "A", "B" and "C" when activated. To compose an SMS message with conventional radiotelephone keypads, a user may have to press the keys of the keypad in long, awkward sequences. For example, to select the character "C", a user may have to press the "2" key multiple times to cycle through the possible functions of the key. Composing a simple message of just a few words may require many keystrokes. As such, composing SMS messages in this manner may be difficult and confusing to users.

In addition, as radiotelephones become smaller, less area may be available for keypads. Accordingly, keypads may also become smaller, with the size and spacing of keys decreasing. As keypads become smaller through radiotelephone miniaturization, users may find it more difficult to compose SMS messages. To accommodate radiotelephone miniaturization, it may become necessary to eliminate certain radiotelephone functions because of lack of space for keys to adequately perform these functions. Alternatively, it may be necessary to require certain keys to perform many additional functions.

Voice recognition devices may also be utilized to compose SMS messages via telecommunications devices. Unfortunately, voice recognition techniques may require enhanced memory and processor capabilities that may increase costs associated with manufacturing. Furthermore, voice recognition techniques may have limited vocabularies from which messages can be composed. Also, the use of voice recognition in public may be undesirable because of privacy concerns.

Handwriting recognition devices may also be utilized to compose SMS messages via telecommunications devices and may overcome the limited vocabulary problem associated with voice recognition devices. Unfortunately, conventional handwriting recognition devices may require high-resolution touch pads and various complex and expensive electronic components which can increase the manufacturing costs of telecommunications devices.

SUMMARY OF THE INVENTION

In view of the above, it is an object of the present invention to provide ergonomic, easy-to-use alphanumeric character input devices for composing messages, such as SMS messages, on small, handheld radiotelephones.

It is another object of the present invention to facilitate radiotelephone miniaturization efforts by providing alphanumeric character input devices for radiotelephones that need not compromise conventional keypad functionality.

It is another object of the present invention to allow simplified radiotelephone assembly and reduced manufacturing costs.

These and other objects of the present invention can be provided by input devices for use with radiotelephones, and other electronic devices, that recognize and display handwritten alphanumeric characters on a radiotelephone display. A plurality of adjacent touch switches are arranged in an array beneath an exposed touch pad. Each touch switch in the array produces a respective analog voltage signal ("on" or "off") in response to user activation of an area of the touch pad during a handwriting stroke.

An analog/digital converter receives and converts a sequence of analog voltage signals produced by a user activating one or more of the touch switches during a handwriting stroke into a sequence of digital values. A processor, working in conjunction with a handwriting recognition algorithm, processes the sequence of digital values, recognizes the alphanumeric characters that corresponds to the handwriting strokes of the user, and then displays the recognized alphanumeric characters within the radiotelephone display.

Input devices that recognize and display handwritten alphanumeric characters within a radiotelephone display according to the present invention may be located in various positions and locations on a radiotelephone housing. For example, an array of touch switches may be located on a flip cover of a radiotelephone so as to be exposed when the flip cover is in an open position. Applying pressure to the touch pad surface using a stylus or other object, including a finger, a user may form individual alphanumeric characters via conventional handwriting strokes.

Input devices according to the present invention may require less space than conventional radiotelephone keypads. Accordingly, radiotelephone miniaturization efforts can be accommodated by the present invention. Furthermore, handwriting recognition devices according to the present invention may not require enhanced memory or processor capabilities as compared with conventional high resolution touchpads which typically detect handwriting at the pixel level and, thus, may require high resolution analog/digital converters.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings. It will be understood that when an element such as a layer, region or substrate is referred to as being "on" another element, it can be directly on the other element or intervening elements may also be present. In contrast, when an element is referred to as being "directly on" another element, there are no intervening elements present. Moreover, each embodiment described and illustrated herein includes its complementary conductivity type embodiment as well.

Figures 1, 2:
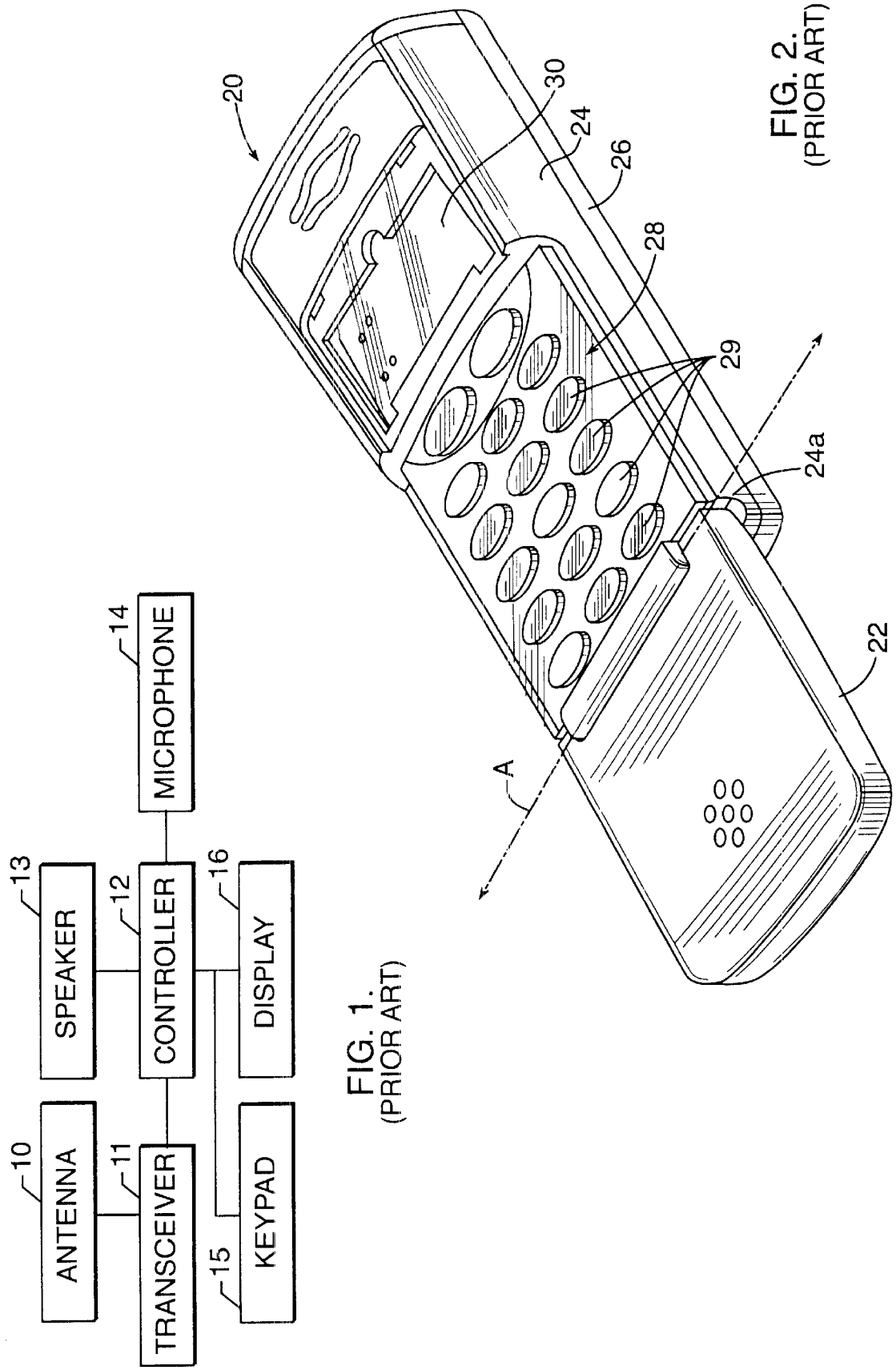
FIG. 1 is a schematic illustration of a conventional arrangement of electronic components for enabling a radiotelephone to transmit and receive radiotelephone communications signals.
FIG. 2 is a perspective view of an exemplary radiotelephone having a flip cover and in which an input device that recognizes and displays handwritten alphanumeric characters according to the present invention may be incorporated.

A conventional arrangement of electronic components that enable a radiotelephone to transmit and receive telecommunications signals is shown schematically in FIG. 1, and is understood by those skilled in the art of radiotelephone communications. An antenna 10 for receiving and transmitting wireless telecommunications signals is electrically connected to a radio-frequency transceiver 11 that is further electrically connected to a controller 12, such as a microprocessor. The controller 12 is electrically connected to a speaker 13 that transmits a remote signal from the controller 12 to a user of a radiotelephone. The controller 12 is also electrically connected to a microphone 14 that receives a voice signal from a user and transmits the voice signal through the controller 12 and transceiver 11 to a remote device. The controller 12 is electrically connected to a keypad 15 and display 16 that facilitate radiotelephone operation.

Referring now to FIG. 2, an exemplary handheld radiotelephone 20 having a flip cover is illustrated. The illustrated radiotelephone 20 includes a top handset housing 24 and a bottom handset housing 26 connected thereto to form a cavity therein. Top and bottom handset housings 24 and 26 house a keypad 28 including a plurality of keys 29, a display 30, and electronic components (not shown) that enable the radiotelephone 20 to transmit and receive radiotelephone communications signals. The display 30 is configured to display sequences of alphanumeric characters that represent telephone numbers to be dialed, other commands to be executed by the radiotelephone 20, or SMS messages to be transmitted by the radiotelephone 20.

A flip cover 22 is hinged to a lower end 24a of the top housing 24, as illustrated. In operation, the flip cover 22 may be pivoted by a user about an axis A between an open position and a closed position. When in a closed position, the flip cover 22 may provide protection to the keypad 28 mounted within the top handset housing 24 from unintentional activation or exposure to the elements. When in an open position, the flip cover 22 may provide a convenient extension to the radiotelephone 20 and, when fitted with a microphone, may be favorably positioned to receive audio input from a user. As understood by those of skill in the art, alphanumeric characters may be entered into the display 30 via the various keys 29 of the keypad 28.

Figure 3:
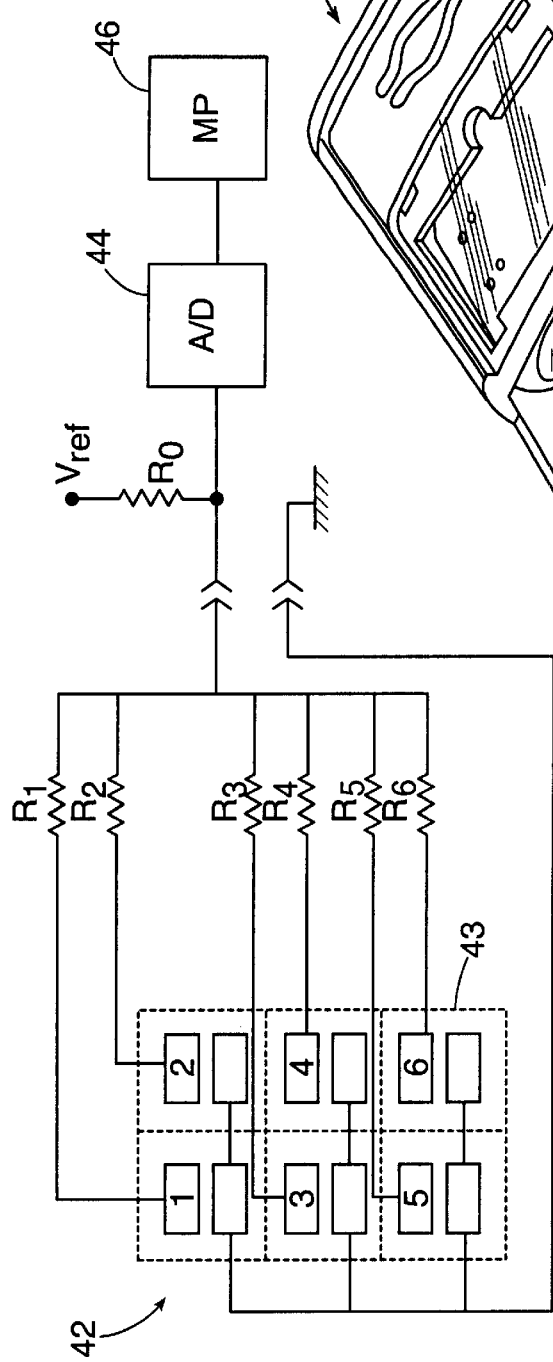
FIG. 3 is a schematic illustration of an input device that recognizes and displays handwritten alphanumeric characters within an electronic device display according to the present invention.

Referring now to FIG. 3, an input device 40 according to an embodiment of the present invention that recognizes and displays handwritten alphanumeric characters on an electronic device display, is schematically illustrated. The input device 40 includes a plurality of adjacent touch switches arranged in an array 42. The touch switches are individually numbered 1–6, as illustrated. Each touch switch in the array 42 produces a respective analog voltage signal in response to user activation during a handwriting stroke on a touchpad 43 overlying the array 42. An analog/digital converter 44 receives and converts the sequence of analog voltage signals produced by a user activating one or more of the touch switches during a handwriting stroke into a sequence of digital values. A processor 46, that may be embodied as a general purpose processor running a stored program, a special purpose processor and/or a special purpose logic circuit, processes the sequence of digital values, recognizes the alphanumeric characters that corresponds to the handwriting strokes of the user, and then displays the recognized alphanumeric characters within the display of an electronic device, such as a radiotelephone.

Figure 4:
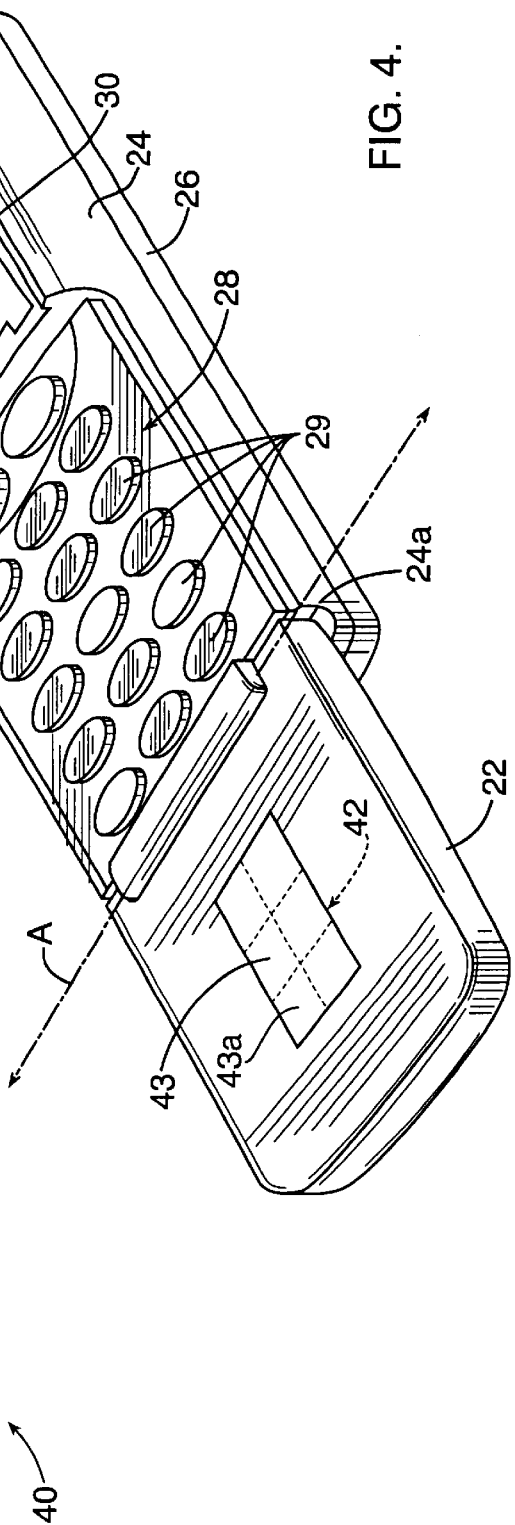
FIG. 4 is a perspective view of a radiotelephone having an array of touch switches for an input device according to the present invention disposed within a flip cover thereof.

Referring now to FIG. 4, a touch pad 43 including an array 42 of switches disposed thereunder, according to the present invention, is disposed within the flip cover 22 of the illustrated radiotelephone 20. The touch pad 43 is exposed when the flip cover 22 is in the open position and is configured to receive handwriting strokes from a user. The individual switches in the array 42, which are positioned beneath the touch pad 43, are indicated in phantom lines in FIG. 4.

The touch pad 43 includes a top surface 43a upon which a user "writes". Applying pressure to the touch pad top surface 43a using a stylus or other object, including a finger, a user may form individual alphanumeric characters via conventional handwriting strokes.

Figure 5:
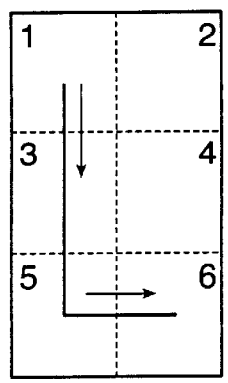
FIG. 5 illustrates a conventional handwriting stroke of a user for the alphanumeric character "L" via the array of touch switches of FIG. 4.

FIG. 5 illustrates a conventional handwriting stroke a user may use for entering an "L" in the display of a radiotelephone via the input device of the present invention. The handwriting stroke for producing the illustrated "L" character creates the following activation sequence of switches in the array 42: 1-3-5-6. An analog/digital converter (44, FIG. 3) converts this sequence into a sequence of digital values which are then processed by a processor (46, FIG. 3). It will be understood that the analog/digital converter(44, FIG. 3) maybe incorporated into the processor (46, FIG. 3), so that the analog voltages may be applied directly to the processor. Moreover, the resistors (R1–R6), analog/digital converter(44, FIG. 3)and processor (46, FIG. 3) may be embodied in a single integrated circuit.

Referring back to FIG. 3, each touch switch within the array 42 is preferably an "area" touch switch that generates a respective analog voltage signal when a user touches any portion thereof. Each touch switch is connected with a respective resistor (R1–R6) electrically connected in series with an analog/digital converter 44 via a two-wire circuit, as illustrated. Each resistor (R1–R6) has a respective resistance value that is different from the other resistors (R1–R6). For example, the value of R1 may be greater than the value of R2; the value of R2 may be greater than the value of R3; and so forth (i.e., R1>R2>R3>R4>R5>R6).

When a touch switch is closed as a result of pressure on the touch pad top surface 43*a* from a user's handwriting stroke, the respective series resistor associated therewith is grounded. For example, if touch switch 1 in the array 42 is closed, resistor R1 is grounded. As a result, voltage to the analog/digital converter 44 resulting from the closure of a switch may be determined by the equation: $V_{in}=V_{ref}\times(R1/(R0+R1))$. $V_{in}$ represents the analog voltage signal from closure of a switch; $V_{ref}$ represents a reference voltage applied to the input device 40; and R0 represents the resistance of the resistor that provides a voltage divider.

The closure of each touch switch in the array 42 generates a different, respective voltage signal. By measuring signal voltage, it can be determined which touch switch has been depressed (i.e., closed) by a user during a handwriting stroke. Preferably, the difference in resistance between the resistors(R1–R6) is large so that a coarse and relatively inexpensive analog/digital converter may be utilized. For example, a 3 bit analog/digital converter may be used. This can be a significant advantage of the present invention over conventional high resolution touchpads which typically detect handwriting at the pixel level and, thus, require high resolution analog/digital converters (i.e., typically greater than 10 bit resolution).

Figure 7:
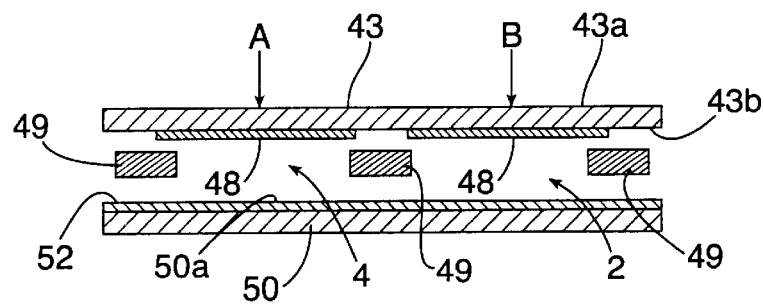
FIG. 7 is a cross-sectional view of adjacent touch switches 4 and 2 of FIG. 6 taken along lines 7—7 and illustrating a first embodiment thereof.
Figure 8:
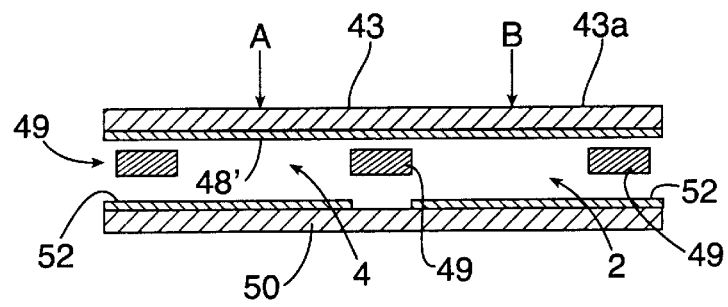
FIG. 8 is a cross-sectional view of adjacent touch switches 4 and 2 of FIG. 6 taken along lines 7—7 and illustrating a second embodiment thereof.
Figure 6:
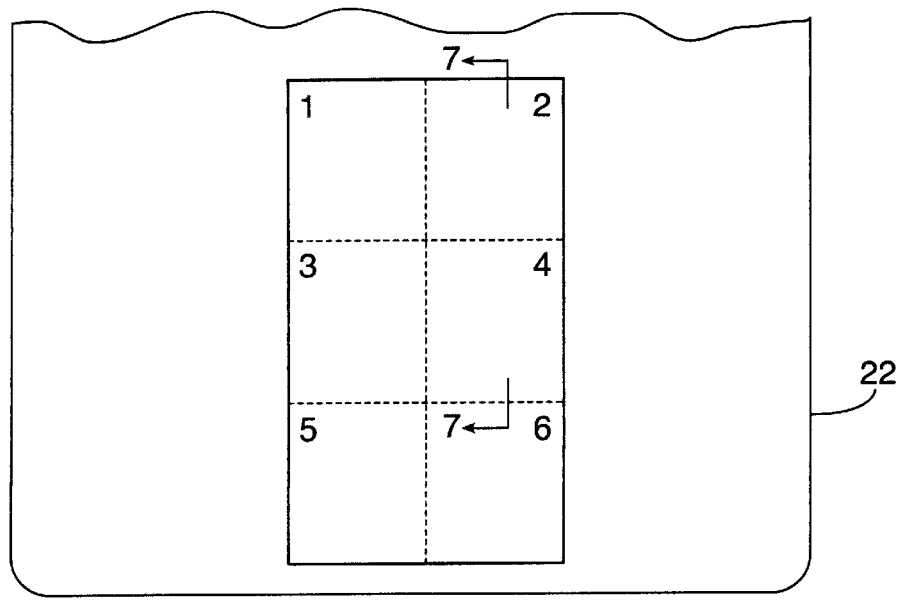
FIG. 6 is an enlarged partial plan view of the flip cover and touch switch array of FIG. 4.

Referring now to FIGS. 6–8, several touch switch implementations according to the present invention are illustrated. FIG. 6 is an enlarged partial plan view of the flip cover and touch pad 43 of FIG. 6 taken along lines 7—7. FIG. 7 is a side cross-sectional view of adjacent touch switches 4 and 2 in the array 42 of FIG. 4. The touch pad 43 is an elastic substrate preferably formed from a dielectric material. The illustrated touch pad 43 has opposite upper and lower surfaces 43*a*, 43*b*. An exemplary dielectric material out of which the touch pad 43 may be formed includes, but is not limited to MYLAR® brand flexible film (E. I. du Pont de Nemours and Company, 1007 Market St., Wilmington Del. 19898). A plurality of spaced apart conductive pads 48 are disposed on the lower surface 43*b* of the touch pad 43 in the pattern of the array 42. Each conductive pad 48 is connected with a respective series resistor. Preferably, each conductive pad 48 is formed from a polymeric material, or a natural or synthetic rubber. Preferably, each conductive pad 48 has conductive material disposed thereon, such as gold plating, or impregnated therein, such as with carbon.

A plurality of thin dielectric spacers 49 are provided and define the outer perimeter of each switch in the array 42, as illustrated. The spacers 49 restrict contact between a conductive pad 48 and the switch plate 52 to the area of the touch pad 43 that has been depressed by a user during a handwriting stroke.

A lower substrate 50, such as a printed circuit board (PCB), having a gold-plated switch plate 52 disposed on a surface 50*a* thereof is maintained in spaced apart relationship with the touch pad 43 such that each conductive pad 48 and the ground plate 50 are in spaced-apart, face-to-face relationship.

In operation, the touch pad 43 elastically deforms when the upper surface 43*a* thereof is depressed by a user during a handwriting stroke. When elastically deformed, the touch pad 43 displaces a respective conductive pad 48 into contact with the ground plate 52 to produce a respective analog voltage signal. For example, when a portion of a handwriting stroke applies a downward force on the touch pad 43 at location A, the conductive pad 48 for switch 4 makes contact with the ground plate 52 and a respective analog voltage signal is generated. Similarly, when a portion of a handwriting stroke applies a downward force on the touch pad 43 at location B, the conductive pad 48 for switch 2 makes contact with the ground plate 52 and a respective analog voltage signal is generated.

FIG. 8 is a side, cross-sectional view of adjacent touch switches 4 and 2 in the array 42 of FIG. 6, also taken along lines 7—7, illustrating an alternative embodiment thereof. A continuous conductive substrate 48' is utilized in lieu of the plurality of conductive pads 48 illustrated in the embodiment of FIG. 7. A plurality of thin dielectric spacers 49 are provided and define the outer perimeter of each switch in the array 42, as illustrated. The spacers 49 restrict contact between the continuous conductive substrate 48' and the ground plate 52 to the area of the touch pad 43 that has been depressed by a user during a handwriting stroke.

In operation, the touch pad 43 elastically deforms when the upper surface 43*a* thereof is depressed by a user during a handwriting stroke. When elastically deformed, the touch pad 43 displaces a portion of the continuous conductive substrate 48' into contact with the switch plate 52 to produce a respective analog voltage signal. For example, when a portion of a handwriting stroke applies a downward force on the touch pad 43 at location A, the continuous conductive substrate 48' associated with switch 4 makes contact with the switch plate 52 and a respective analog voltage signal is generated. As illustrated, each switch plate 52 is electrically isolated from other switch plates 52 and each switch plate 52 is connected with a respective series resistor. Similarly, when a portion of a handwriting stroke applies a downward force on the touch pad 43 at location B, the continuous conductive substrate 48' associated with switch 2 makes contact with the ground plate 52 and a respective analog voltage signal is generated.

The input device processor 46 may be configured to work in conjunction with a handwriting recognition algorithm. Handwriting recognition algorithms are known to those of skill in the art and need not be described further herein.

The present invention may be utilized with various electronic devices and is not limited to use with telecommunications devices. The present invention may also be used with wireless communications devices which only transmit or receive radio frequency signals. In addition, it is understood that the touch pad 43 and array 42 of touch switches described above may have various configurations and may be located in various positions and locations on a radiotelephone housing and flip cover and are not limited to the illustrated configurations, positions and locations.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

The invention is defined by the following claims, with equivalents of the claims to be included therein.

That which is claimed is:

1. A telecommunication device comprising:
    a housing configured to enclose electronic components that transmit and receive telecommunication signals; and
    a handwritten character recognition device, comprising:
        a plurality of adjacent switches located on the housing in an array, wherein each switch in the array produces, in response to user activation during a handwriting stroke, a respective, different analog voltage;
        an analog/digital converter that converts a sequence of analog voltage signals produced by a user activating one or more of the switches during the handwriting stroke into a sequence of digital values; and
        a processor that processes the sequence of digital values and that recognizes an alphanumeric character that corresponds to the handwriting stroke of the user.

2. A telecommunications device according to claim 1 further comprising a display screen located on the housing that is configured to display user-composed alphanumeric characters that represent a message to be used via the telecommunication device, and wherein the processor displays a recognized alphanumeric character within the display.

3. A telecommunication device according to claim 1 wherein each switch in the array comprises:
    an elastic first substrate having a conductive pad disposed on a face thereof;
    a second substrate having a ground plate disposed on a face thereof;
    wherein the first and second substrates are disposed in spaced apart relationship such that the conductive pad and the ground plate are in spaced-apart, face-to-face relationship; and
    wherein the elastic first substrate is configured to elastically deform when depressed by a user during a handwriting stroke to displace the conductive pad into contact with the ground plate to produce a respective analog voltage signal.

4. A telecommunication device according to claim 3 wherein the elastic first substrate comprises dielectric material.

5. A telecommunication device according to claim 3 wherein the conductive pad comprises a material selected from the group consisting of polymers, natural rubber and synthetic rubber and wherein the selected material has a conductive material disposed thereon.

6. A telecommunication device according to claim 3 wherein the second substrate comprises a printed circuit board (PCB).

7. A telecommunication device according to claim 1 wherein the array comprises a two-by-three array.

8. A telecommunication device according to claim 1 wherein the array comprises two columns and three rows.

9. A telecommunication device according to claim 3 further comprising a plurality of dielectric spacers disposed between the elastic first substrate and the second substrate and between respective adjacent switches in the array.

10. A telecommunication device according to claim 1 wherein the telecommunications device is a radiotelephone.

11. A radiotelephone, comprising:
    a housing configured to enclose electronic components that transmit and receive radiotelephone communication signals;
    a display screen located on the housing that is configured to display user-composed alphanumeric characters that represent a message to be transmitted via the radiotelephone;
    a keypad comprising a plurality of keys extending through a top portion of the housing;
    a flip cover hinged to the housing and movable between a closed position wherein the flip cover covers at least a portion of the keypad, and an open position wherein the keypad is uncovered, wherein the flip cover comprises a surface that is exposed when the flip cover is in the open position; and
    a handwritten character recognition device, comprising:
        a plurality of adjacent switches located on the flip cover surface in an array, wherein each switch in the array produces, in response to user activation during a handwriting stroke, a respective, different analog voltage;
        an analog/digital converter that converts a sequence of analog voltage signals produced by a user activating one or more of the switches during the handwriting stroke into a sequence of digital values; and
        a processor that processes the sequence of digital values, recognizes an alphanumeric character that corresponds to the handwriting stroke of the user, and displays the recognized alphanumeric character within the display.

12. A radiotelephone according to claim 11 wherein each switch in the array comprises:
    an elastic first substrate having a conductive pad disposed on a face thereof;
    a second substrate having a ground plate disposed on a face thereof;
    wherein the first and second substrates are disposed in spaced apart relationship such that the conductive pad and the ground plate are in spaced-apart, face-to-face relationship; and
    wherein the elastic first substrate is configured to elastically deform when depressed by a user during a handwriting stroke to displace the conductive pad into contact with the ground plate to produce a respective analog voltage signal.

13. A radiotelephone according to claim 12 wherein the elastic first substrate comprises dielectric material.

14. A radiotelephone according to claim 12 wherein the conductive pad comprises a material selected from the group consisting of polymers, natural rubber and synthetic rubber and wherein the selected material has a conductive material disposed thereon.

15. A radiotelephone according to claim 12 wherein the second substrate comprises a printed circuit board (PCB).

16. A radiotelephone according to claim 11 wherein the array comprises a two-by-three array.

17. A radiotelephone according to claim 11 wherein the array comprises two columns and three rows.

18. A radiotelephone according to claim 12 further comprising a plurality of dielectric spacers disposed between the elastic first substrate and the second substrate and between respective adjacent switches in the array.

19. An electronic device, comprising:
   a housing;
   a display screen located on the housing that is configured to display user-composed alphanumeric characters that represent a message; and
   a handwritten character recognition device, comprising:
      a plurality of adjacent switches located on the housing in an array, wherein each switch in the array produces, in response to user activation during a handwriting stroke, a respective, different analog voltage;
      an analog/digital converter that converts a sequence of analog voltage signals produced by a user activating one or more of the switches during the handwriting stroke into a sequence of digital values; and
      a processor that processes the sequence of digital values, recognizes an alphanumeric character that corresponds to the handwriting stroke of the user, and displays the recognized alphanumeric character within the display.

20. An electronic device according to claim 19 wherein each switch in the array comprises:
   an elastic first substrate having a conductive pad disposed on a face thereof;
   a second substrate having a ground plate disposed on a face thereof;
   wherein the first and second substrates are disposed in spaced apart relationship such that the conductive pad and the ground plate are in spaced-apart, face-to-face relationship; and
   wherein the elastic first substrate is configured to elastically deform when depressed by a user during a handwriting stroke to displace the conductive pad into contact with the ground plate to produce a respective analog voltage signal.

21. An electronic device according to claim 20 wherein the elastic first substrate comprises dielectric material.

22. An electronic device according to claim 20 wherein the conductive pad comprises a material selected from the group consisting of polymers, natural rubber and synthetic rubber and wherein the selected material has a conductive material disposed thereon.

23. An electronic device according to claim 20 wherein the second substrate comprises a printed circuit board (PCB).

24. An electronic device according to claim 19 wherein the array comprises a two-by-three array.

25. An electronic device according to claim 20 further comprising a plurality of dielectric spacers disposed between the elastic first substrate and the second substrate and between respective adjacent switches in the array.

26. An input device that recognizes and displays handwritten alphanumeric characters within an electronic device display, comprising:
   a plurality of adjacent switches arranged in an array, wherein each switch in the array produces, in response to user activation during a handwriting stroke, a respective, different analog voltage;
   an analog/digital converter that converts a sequence of analog voltage signals produced by a user activating one or more of the switches during the handwriting stroke into a sequence of digital values; and
   a processor that processes the sequence of digital values, that recognizes an alphanumeric character that corresponds to the handwriting stroke of the user, and that displays the recognized alphanumeric character within the display.

27. An input device according to claim 26 wherein the array of switches comprises:
   an elastic first substrate having a plurality of spaced apart conductive pads disposed on a face thereof;
   a second substrate having a ground plate disposed on a face thereof;
   wherein the first and second substrates are disposed in spaced apart relationship such that the conductive pads and the ground plate are in spaced-apart, face-to-face relationship; and
   wherein the elastic first substrate is configured to elastically deform when depressed by a user during a handwriting stroke to displace one or more of the conductive pads into contact with the ground plate in a sequence that produces a respective sequence of analog voltage signals.

28. An input device according to claim 27 wherein the elastic first substrate comprises a dielectric material.

29. An input device according to claim 27 wherein each conductive pad comprises a material selected from the group consisting of polymers, natural rubber and synthetic rubber and wherein the selected material has a conductive material disposed thereon.

30. An input device according to claim 27 wherein the second substrate comprises a printed circuit board (PCB).

31. An input device according to claim 26 wherein the array comprises a two-by-three array.

32. An input device according to claim 27 further comprising a plurality of dielectric spacers disposed between the elastic first substrate and the second substrate and between adjacent conductive pads.

33. An input device that recognizes and displays handwritten alphanumeric characters within an electronic device display, comprising:
   a two-by-three array of switches, wherein each switch in the array produces, in response to user activation during a handwriting stroke, a respective, different analog voltage signal, and wherein the array of switches comprises:
      an elastic first substrate having a plurality of spaced apart conductive pads disposed on a face thereof;
      a second substrate having a ground plate disposed on a face thereof;
      wherein the first and second substrates are disposed in spaced apart relationship such that the conductive pads and the ground plate are in spaced-apart, face-to-face relationship; and
      wherein the elastic first substrate is configured to elastically deform when depressed by a user during a handwriting stroke to displace one or more of the conductive pads into contact with the ground plate in a sequence that produces a respective sequence of analog voltage signals;

an analog/digital converter that converts the sequence of analog voltage signals produced by a user activating one or more of the switches during a handwriting stroke into a sequence of digital values; and a processor that processes the sequence of digital values and displays an alphanumeric character within the display that corresponds to the handwriting stroke of the user.

34. An input device according to claim 33 wherein the elastic first substrate comprises dielectric material.

35. An input device according to claim 33 wherein each conductive pad comprises a material selected from the group consisting of polymers, natural rubber and synthetic rubber and wherein the material has a conductive material disposed thereon.

36. An input device according to claim 33 wherein the second substrate comprises a printed circuit board (PCB).

37. An input device according to claim 33 further comprising a plurality of dielectric spacers disposed between the elastic first substrate and the second substrate and between adjacent conductive pads.

* * * * *